United States Patent
Liao et al.

(10) Patent No.: US 7,916,176 B2
(45) Date of Patent: Mar. 29, 2011

(54) DEVICE OF OFFSET COMPENSATION FOR SOLID-STATE IMAGING DEVICE AND RELATED METHOD

(75) Inventors: Kun-Chi Liao, Taichung (TW); Yu-Ting Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 344 days.

(21) Appl. No.: 11/867,018

(22) Filed: Oct. 4, 2007

(65) Prior Publication Data
US 2008/0225151 A1    Sep. 18, 2008

(30) Foreign Application Priority Data

Mar. 12, 2007    (TW) ................ 96108452 A

(51) Int. Cl.
*H04N 5/228*    (2006.01)

(52) U.S. Cl. .................. 348/208.2; 348/208.4

(58) Field of Classification Search ............ 348/208.99, 348/208.2, 208.4–208.8, 208.11–208.13
See application file for complete search history.

(56) References Cited

U.S. PATENT DOCUMENTS

| | | | | |
|---|---|---|---|---|
| 4,780,739 A | * | 10/1988 | Kawakami et al. | 396/54 |
| 5,386,264 A | * | 1/1995 | Sekine et al. | 396/55 |
| 6,992,700 B1 | * | 1/2006 | Sato et al. | 348/208.2 |
| 7,436,435 B2 | * | 10/2008 | Wada | 348/208.4 |
| 2006/0092285 A1 | * | 5/2006 | Shin | 348/208.7 |
| 2007/0058076 A1 | * | 3/2007 | Seo | 348/373 |

* cited by examiner

*Primary Examiner* — Kelly L Jerabek
(74) *Attorney, Agent, or Firm* — Thomas|Kayden

(57) ABSTRACT

A method of offset compensation for solid-state imaging devices is provided. In the method a first and second detection signal are obtained. The two signals are compared to obtain a difference value. A variable voltage is output according to the difference value to drive a magnetic element. The solid-state imaging device is moved by the magnetic element to compensate the offset of the solid-state imaging device. A system of offset compensation of the solid-state imaging device is also disclosed.

17 Claims, 6 Drawing Sheets

DEVICE OF OFFSET COMPENSATION FOR SOLID-STATE IMAGING DEVICE AND RELATED METHOD

BACKGROUND OF THE INVENTION

1. Field of the Invention

The invention relates to a system and method for compensating offset of a solid-state imaging device, and more particularly to a system and method for compensating offset of a solid-state imaging device used in a camcorder.

2. Description of the Related Art

Generally, a vibration problem exists in camcorders, particularly in lightweight digital cameras. While a shutter button is pressed, a user may cause camera vibration due to shaking hands or pressure on the shutter button. Thus, user instability may result in blurry images.

A camcorder typically has an angular velocity sensor and a position sensor to detect moving angle variation and position variation while the camcorder operates, and to generate corresponding sensing signals respectively. The angular velocity sensor, such as a gyro sensor, detects variation of angle, angular velocity, or angular acceleration while the camcorder operates. The position sensor, such as Hall effect sensor, is used to detect position variation while the camcorder operates. Subsequent to movement amount detection by the sensors, detected data can be calculated to determine the required compensating movement. Compensating for the direction and amount of movement through a set of compensating lens can thus eliminate vibration. This method, however, requires at least two sensors, and must work with the set of compensating lens. The described design, however, is both difficult to implement and expensive to produce.

Thus, a reduced cost compensation system capable of eliminating blur from vibration is desirable.

BRIEF SUMMARY OF THE INVENTION

The invention provides a system and method of offset compensation for solid-state imaging devices capable of eliminating blur due to camcorder vibration.

One embodiment, according to the invention, provides a system of offset compensation for solid-state imaging devices. The system comprises a sensor, a calculating circuit, a delay circuit, an auto-control device, a driving device, and a magnetic element. The sensor, coupled to a solid-state imaging device, is configured to continuously detect the solid-state imaging device to generate a sensing signal. The calculating circuit is configured to receive and process the sensing signal to generate a first signal. The delay circuit is configured to delay the first signal to generate a second signal. The auto-control device is configured to receive and compare the first and second signals to obtain an error value, and to output an error-control signal according to the error value. The driving device is configured to receive the error-control signal, and to generate an electric signal according to the error-control signal. The electric signal drives the magnetic element for generating magnetic force to move the solid-state imaging device, thus offset of the solid-state imaging device is compensated.

Another embodiment of the invention, provides a method of offset compensation for solid-state imaging devices. The method comprises obtaining a first sensing signal, wherein the first sensing signal is first movement data of a solid-state imaging device. Next, a second sensing signal is obtained, wherein the second sensing signal is second movement data of a solid-state imaging device. Next, the first and second sensing signals are compared to obtain an error value representing an offset value of the solid-state imaging device. Next, an electric signal is output according to the error value to drive a magnetic element. Finally, the magnetic element is utilized to move the solid-state imaging device for compensating the offset value of the solid-state imaging device.

The system and method of the invention provide a simplified and low cost optical anti-vibration effect for reducing blur resulting from movement while capturing images.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
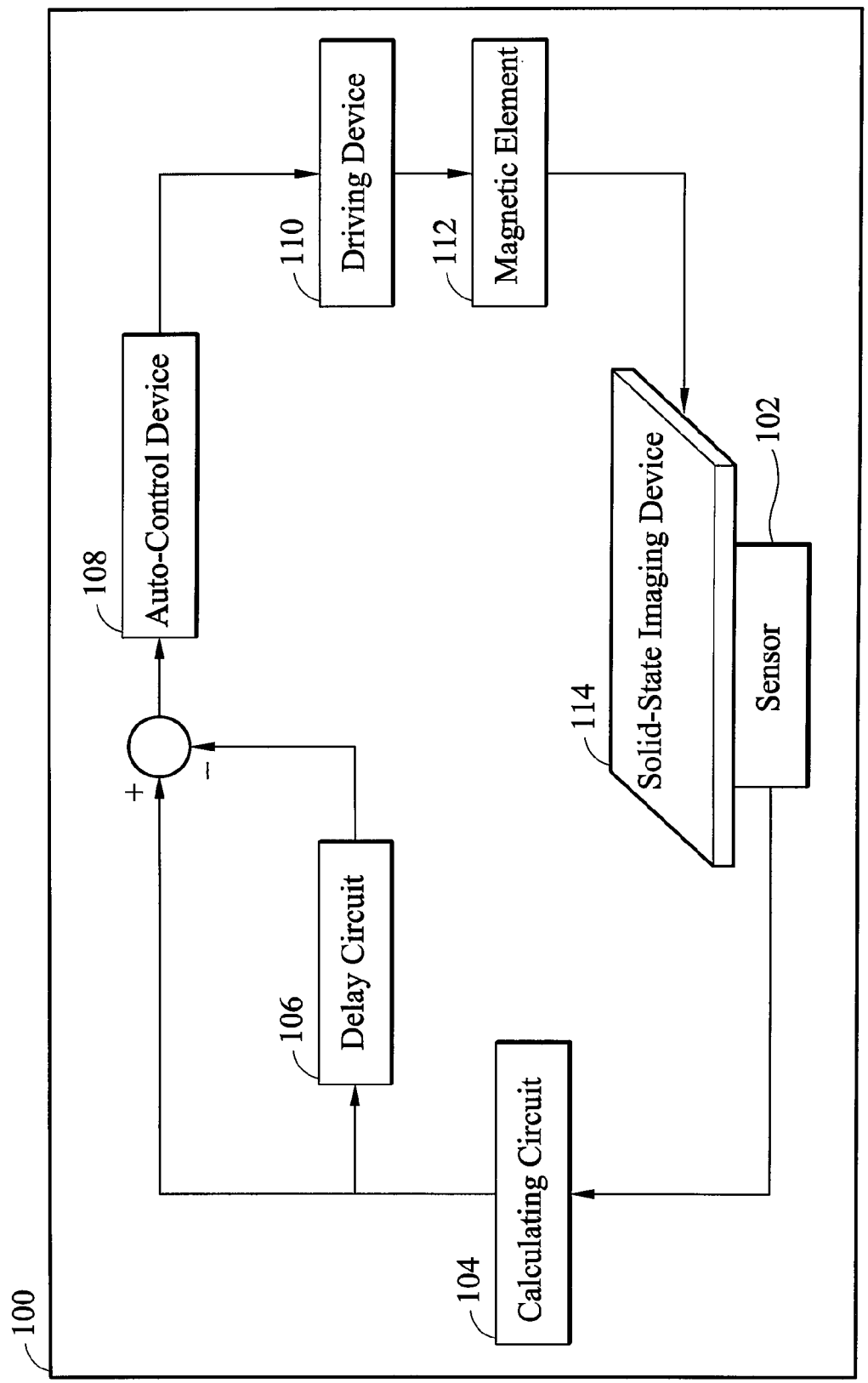
FIG. 1 shows a system of offset compensation for solid-state imaging devices.

FIG. 1 shows a system of offset compensation for solid-state imaging devices. The system is used in a camcorder 100, which comprises a sensor 102, a calculating circuit 104, a delay circuit 106, an auto-control device 108, a driving device 110, and a magnetic element 112. Sensor 102, coupled to a solid-state imaging device 114, is configured to continuously detect the variation of movement data to generate a sensing signal while the solid-state imaging device 114 operates. Sensor 102 can be a dip sensor or an acceleration sensor. The solid-state imaging device 114 can be a charge-coupled device (CCD). Calculating circuit 104 is configured to receive and process the sensing signal output from sensor 102 to output a calculating signal, wherein calculating circuit 104 can be an integrator, a differentiator, or a multiplier. Delay circuit 106 is configured to postpone the calculating signal output from calculating circuit 104, and to provide a delay signal for comparison with the calculating signal. Auto-control device 108 receives an error value and outputs an error-control signal according to the error value. The error value is obtained by comparing a calculating signal output from calculating circuit 104 with a delay signal. The delay signal is a previous calculating signal output from delay circuit 106. Auto-control device 108 can be a proportional-integral-derivative (PID) controller. Driving device 110 receives the error-control signal output from auto-control device 108 and generates a variable voltage or a pulse-width-modulation (PWM) signal according to the error-control signal. Driving device 110 can be a motor driver. Magnetic element 112 generates magnetic force according to the variable voltage output from driving device 110 for compensating the solid-state imaging device 114. The magnetic element 112 can be an induction coil.

Figure 2:
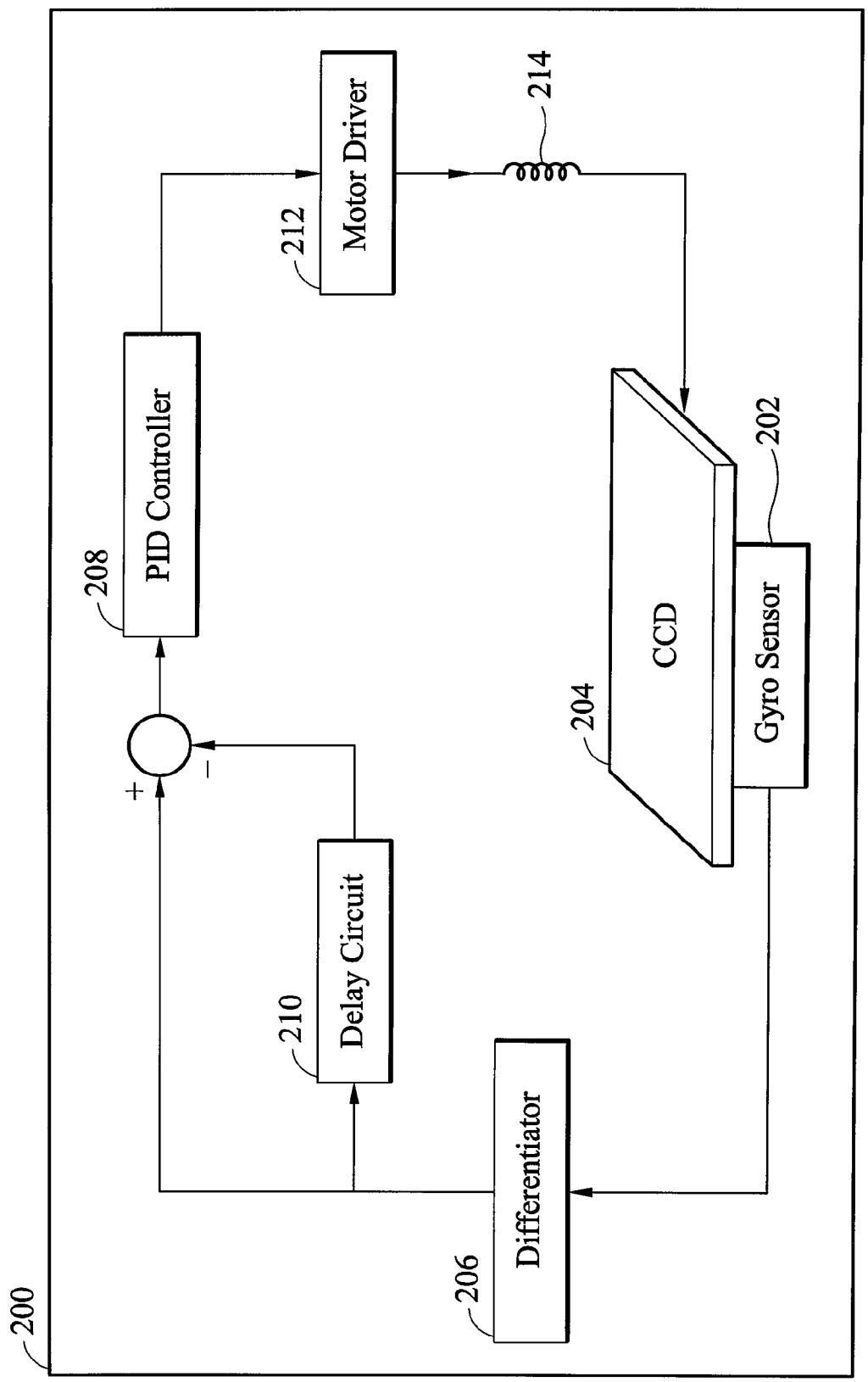
FIG. 2 shows an embodiment of a system of offset compensation for solid-state imaging devices of the invention.

FIG. 2 shows an embodiment of a system of offset compensation for solid-state imaging devices. In this embodiment, camcorder 200 uses a dip sensor, such as gyro sensor 202, to detect the angular variation of CCD 204. When detecting the angular acceleration of CCD 204 for error comparison, gyro sensor 202 continuously detects the movement of CCD 204 to output an angular speed signal. The angular speed signal is passed to differentiator 206 for conversion to an angular acceleration signal. The angular acceleration signal is compared with its previous angular acceleration signal delayed by delay circuit 210 to obtain an angular acceleration error value. PID controller 208 outputs a PWM signal according to the angular acceleration error value. Motor driver 212 generates a variable voltage according to the PWM signal to drive induction coil 214. Induction coil 214 induces magnetic force to move CCD 204 for compensating the offset of CCD 204 due to vibration.

Figure 3:
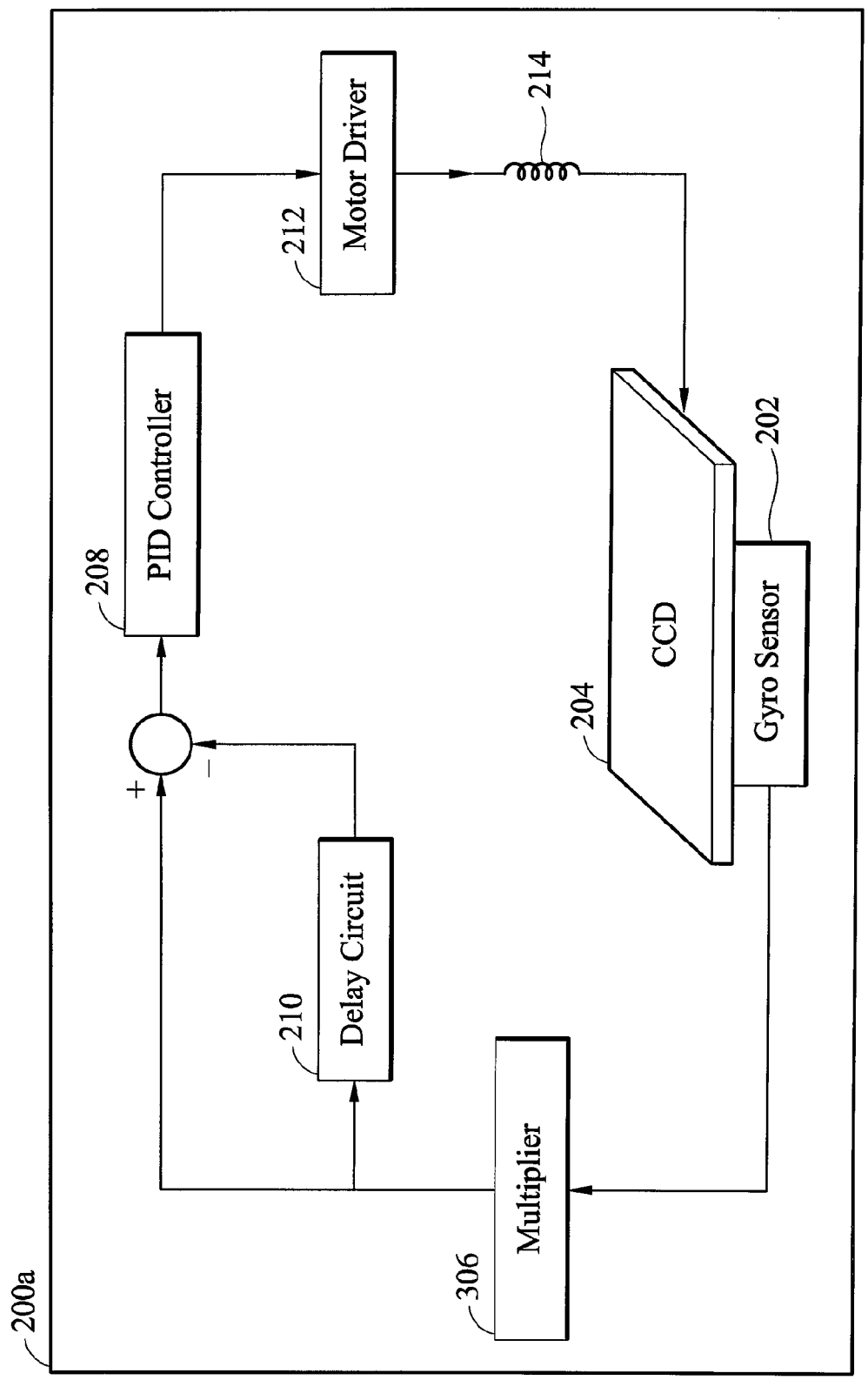
FIG. 3 shows another embodiment of a system of offset compensation for solid-state imaging devices of the invention.

FIG. 3 shows an embodiment of a system of offset compensation for solid-state imaging devices. In this embodiment, camcorder 200a also uses gyro sensor 202 to detect the angular variation of CCD 204. When detecting the angular speed of CCD 204 for error comparison, gyro sensor 202 continuously detects the movement of CCD 204 to output an angular speed signal. The angular speed signal is multiplied by a constant through multiplier 306 to modify the angular speed signal within a specific range. Subsequently, the angular speed signal is compared with its previous angular speed signal delayed by delay circuit 210 to obtain an angular speed error value. PID controller 208 receives the angular speed error value and outputs a PWM signal according to the angular speed error value. Motor driver 212 generates a variable voltage according to the PWM signal to drive induction coil 214. Induction coil 214 induces magnetic force to move CCD 204 for compensating the offset of CCD 204 due to vibration.

Figure 4:
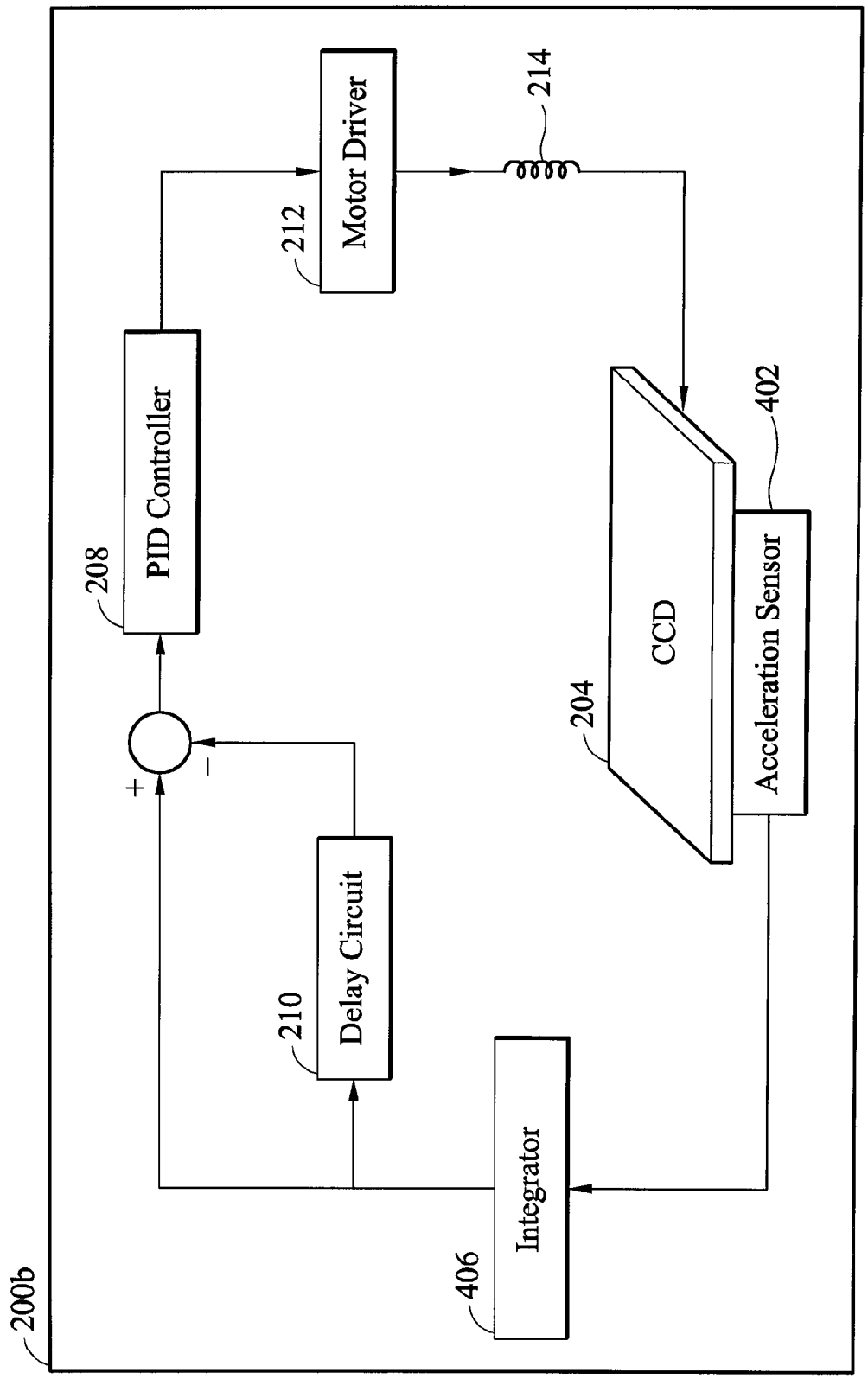
FIG. 4 shows another embodiment of a system of offset compensation for solid-state imaging devices of the invention.

FIG. 4a shows an embodiment of a system of offset compensation for solid-state imaging devices. In this embodiment, camcorder 200b uses acceleration sensor 402 to detect the position variation of CCD 204. When detecting the speed of CCD 204 for error comparison, acceleration sensor 402 continuously detects the movement of CCD 204 to output an acceleration signal. Integrator 406 receives and calculates the acceleration signal to output a speed signal. The speed signal is subsequently compared with its previous speed signal delayed by delay circuit 210 to obtain a speed error value. PID controller 208 receives the speed error value and outputs a PWM signal according to the speed error value. Motor driver 212 generates a variable voltage according to the PWM signal to drive induction coil 214. Induction coil 214 induces magnetic force to move CCD 204 for compensating the offset of CCD 204 due to vibration.

Figure 5:
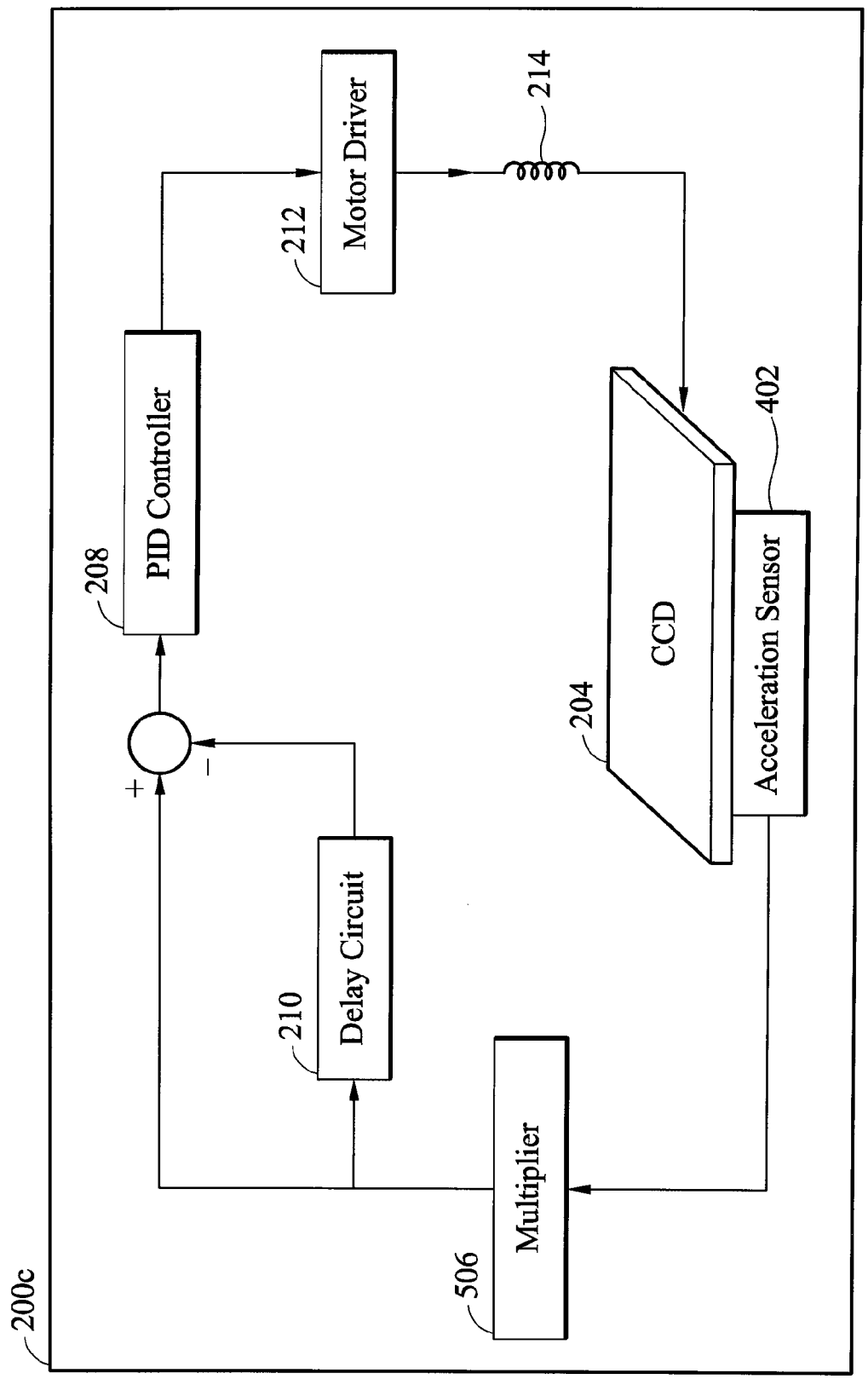
FIG. 5 shows another embodiment of a system of offset compensation for solid-state imaging devices of the invention.

FIG. 5 shows an embodiment of a system of offset compensation for solid-state imaging devices. In this embodiment, camcorder 200c also uses acceleration sensor 402 to detect the position variation of CCD 204. When detecting the acceleration of CCD 204 for error comparison, acceleration sensor 402 continuously detects the movement of CCD 204 to output an acceleration signal. The acceleration signal is multiplied by a constant through multiplier 506 to modify the acceleration signal within a specific range. The acceleration signal is subsequently compared with its previous acceleration signal delayed by delay circuit 210 to obtain an acceleration error value. PID controller 208 receives the speed error value and outputs a PWM signal according to the speed error value. Motor driver 212 generates a variable voltage according to the PWM signal to drive induction coil 214. Induction coil 214 induces magnetic force to move CCD 204 for compensating the offset of CCD 204 due to vibration.

Figure 6:
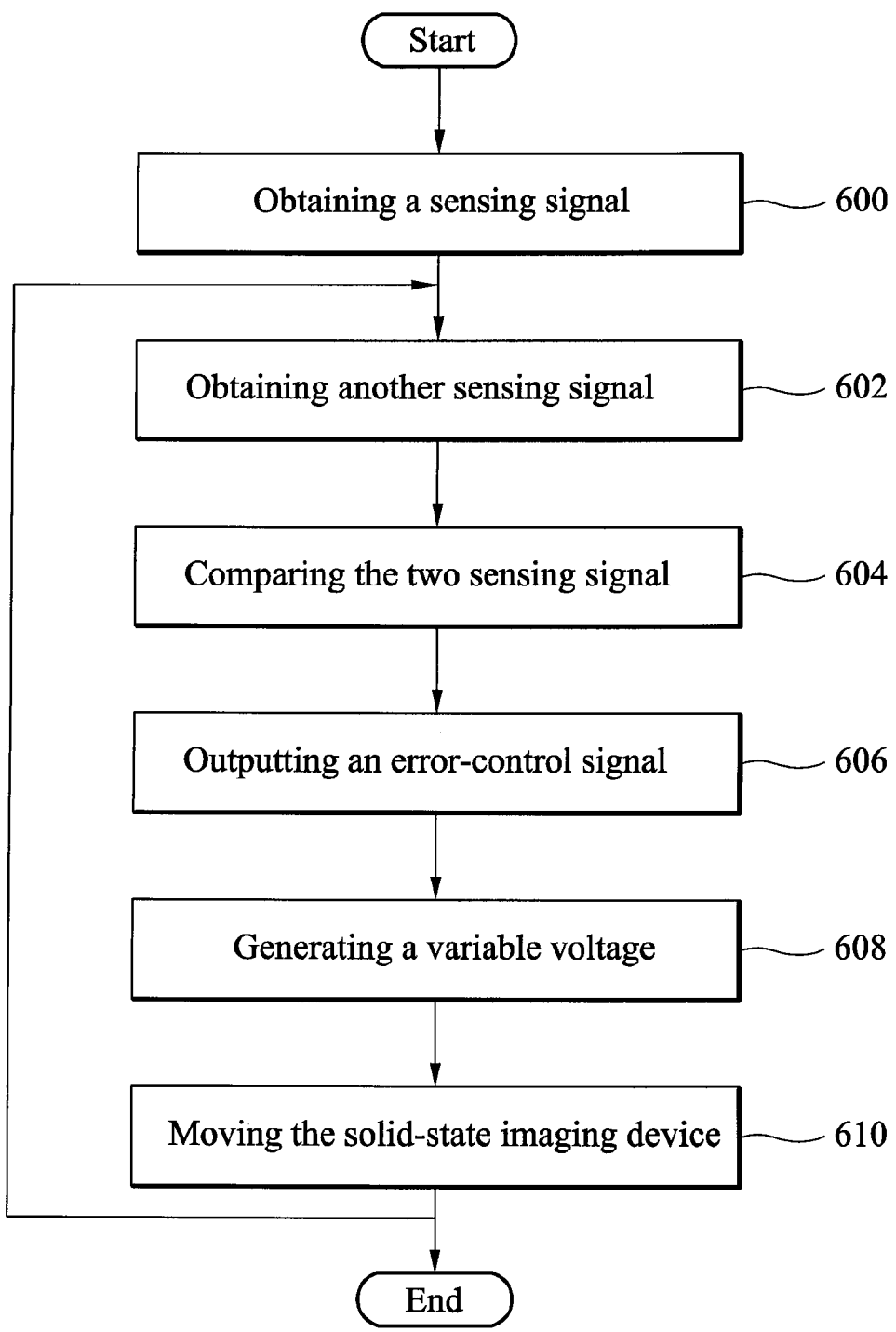
FIG. 6 shows another embodiment of a method of offset compensation for solid-state imaging devices of the invention.

FIG. 6 shows an embodiment of a method of offset compensation for solid-state imaging devices. In the method, a sensing signal is obtained though a sensor, by continuously detecting the movement variation of a solid-state imaging device while operating (step 600). The sensing signal is the movement variation data of a solid-state imaging device, and the solid-state imaging device can be a CCD. The sensor subsequently obtains another sensing signal (step 602) for comparison with the previous sensing signal. When a dip sensor is used, such as gyro sensor, to detect the movement variation, both sensing signals can be angular speed signals or angular acceleration signals. When an acceleration sensor is used to detect the movement variation, both sensing signals can be speed signals or acceleration signals.

Two sensing signals, subsequently generated at different times, are compared to obtain an error value representing an offset of the solid-state imaging device (step 604). An error-control signal is output corresponding to the error value for compensation (step 606), for example, outputting a PWM signal by a PID controller. Additionally, a variable voltage or a PWM signal is generated according to the error-control signal to drive a magnetic element (step 608). The magnetic element can be an induction coil. Finally, the solid-state imaging device is shifted by magnetic force induced from the magnetic element for compensating the offset of the solid-state imaging device (step 610). At this point, if the solid-state imaging device has not been compensated completely so as to return to its original position, the method returns to step 602 to obtain another sensing signal for comparison until compensation is complete.

The system and method of offset compensation for solid-state imaging devices provides an optical anti-vibration effect for reducing blurry images resulting from vibration while capturing images. The anti-vibration design is simplified and can reduce production costs.

While the invention has been described by way of examples and in terms of preferred embodiments, it is to be understood that the invention is not limited thereto. Any variation or modification can be made by those skilled in art without departing from the spirit or scope of the invention. Therefore, the scope of the appended claims should be accorded the broadest interpretation to encompass all such modifications and similar arrangements.

What is claimed is:

1. A system of offset compensation for solid-state imaging devices, comprising:
   a sensor, which is a dip sensor or an acceleration sensor, coupled to a solid-state imaging device, configured to continuously detect the solid-state imaging device to generate a sensing signal;
   a calculating circuit configured to receive the sensing signal and output a first signal;
   a delay circuit configured to delay the first signal, which is generated by processing the sensing signal from the sensor by the calculating circuit, to generate a second signal;
   an auto-control device configured to receive and compare the first and second signal to obtain an error value, and to output an error-control signal according to the error value;
   a driving device configured to receive the error-control signal and generate an electric signal according to the error-control signal; and
   a magnetic element configured to generate magnetic force based on the electric signal to shift the solid-state imaging device for compensating an offset of the solid-state imaging device.

2. The system of offset compensation for solid-state imaging devices of claim 1, wherein the dip sensor is a gyro sensor.

3. The system of offset compensation for solid-state imaging devices of claim 1, wherein the sensing signal is an angular speed signal.

4. The system of offset compensation for solid-state imaging devices of claim 3, wherein the calculating circuit is a differentiator and the first signal is an angular acceleration signal.

5. The system of offset compensation for solid-state imaging devices of claim 3, wherein the calculating circuit is a multiplier and the first signal is an angular signal.

6. The system of offset compensation for solid-state imaging devices of claim 1, wherein the sensing signal is an acceleration signal.

7. The system of offset compensation for solid-state imaging devices of claim 6, wherein the calculating circuit is an integrator and the first signal is a speed signal.

8. The system of offset compensation for solid-state imaging devices of claim 6, wherein the calculating circuit is a multiplier and the first signal is an acceleration signal.

9. The system of offset compensation for solid-state imaging devices of claim 1, wherein the auto-control device is a proportional-integral-derivative controller.

10. The system of offset compensation for solid-state imaging devices of claim 9, wherein the error-control signal is a pulse-width-modulation signal.

11. The system of offset compensation for solid-state imaging devices of claim 1, wherein the magnetic element is an induction coil.

12. The system of offset compensation for solid-state imaging devices of claim 1, wherein the solid-state imaging device is a charge-coupled device.

13. A method of offset compensation for solid-state imaging devices, comprising:
obtaining a first sensing signal by a sensor, wherein the first sensing signal is a first offset value of the solid-state imaging device during a first time period and the sensor is a dip sensor or an acceleration sensor;
delaying the first sensing signal by a delay circuit to generate a delayed sensing signal;
obtaining a second sensing signal by the sensor, wherein the second sensing signal is a second offset value of the solid-state imaging device during a second time period and the first time period is antecedent to the second time period;
comparing the delayed sensing signal and the second sensing signal to obtain an error value representing an offset of the solid-state imaging device;
outputting an electric signal to drive a magnetic element according to the error value; and
shifting the solid-state imaging device by the magnetic element to compensate the offset of the solid-state imaging device.

14. The method of offset compensation for solid-state imaging devices of claim 13, further comprising:
generating an error-control signal according to the error value; and
outputting the electric signal according to the error-control signal.

15. The method of offset compensation for solid-state imaging devices of claim 14, wherein the error-control signal is a pulse-width-modulation signal.

16. The method of offset compensation for solid-state imaging devices of claim 13, wherein the first sensing signal is an angular speed signal or an angular acceleration signal, and the second sensing signal is an angular speed signal or an angular acceleration signal.

17. The method of offset compensation for solid-state imaging devices of claim 13, wherein the first sensing signal is a speed signal or an acceleration signal, and the second sensing signal is a speed signal or an acceleration signal.

* * * * *